United States Patent
Okamura et al.

(10) Patent No.: US 8,673,695 B2
(45) Date of Patent: *Mar. 18, 2014

(54) SAPPHIRE WAFER DIVIDING METHOD

(75) Inventors: Takashi Okamura, Ota-Ku (JP);
Hitoshi Hoshino, Ota-Ku (JP)

(73) Assignee: Disco Corporation, Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 13/308,937

(22) Filed: Dec. 1, 2011

(65) Prior Publication Data

US 2012/0156816 A1    Jun. 21, 2012

(30) Foreign Application Priority Data

Dec. 16, 2010  (JP) .................................. 2010-280607

(51) Int. Cl.
*H01L 21/00*  (2006.01)

(52) U.S. Cl.
USPC ........................................................ 438/149

(58) Field of Classification Search
None
See application file for complete search history.

(56) References Cited

U.S. PATENT DOCUMENTS

2007/0134833 A1* 6/2007 Ikemoto et al. ................ 438/33
2010/0270548 A1* 10/2010 Ikemoto et al. ................ 257/43

FOREIGN PATENT DOCUMENTS

| JP | 10-056203 | 2/1998 |
| JP | 10-305420 | 11/1998 |
| JP | 3408805 | 3/2003 |

* cited by examiner

*Primary Examiner* — Charles Garber
*Assistant Examiner* — Andre' C Stevenson
(74) *Attorney, Agent, or Firm* — Greer Burns & Crain, Ltd.

(57) ABSTRACT

A sapphire wafer dividing method including a modified layer forming step of forming a plurality of modified layers inside a sapphire wafer along a plurality of crossing division lines formed on the front side where a light emitting layer is formed, and a chamfering and dividing step of forming a plurality of cut grooves on the back side of the sapphire wafer along the division lines, thereby dividing the sapphire wafer into individual light emitting devices along the modified layers as a division start point, wherein the corners of the back side of each light emitting device are chamfered by the formation of the cut grooves in the chamfering and dividing step.

1 Claim, 5 Drawing Sheets

FIG.1

Z DIRECTION
Y DIRECTION
X DIRECTION

SAPPHIRE WAFER DIVIDING METHOD

BACKGROUND OF THE INVENTION

1. Field of the Invention

The present invention relates to a dividing method for dividing a light emitting device wafer into individual light emitting devices, and more particularly to a dividing method for dividing a sapphire wafer.

2. Description of the Related Art

A light emitting device such as a light emitting diode (LED) having a sapphire substrate and a light emitting layer formed on the front side of the sapphire substrate is known (see Japanese Patent Laid-open No. Hei 10-056203, for example). This light emitting device is manufactured by dividing a sapphire wafer into a plurality of pieces along a plurality of crossing division lines, wherein the sapphire wafer is composed of a sapphire substrate and a light emitting layer formed on the sapphire substrate. As a dividing method for a light emitting device wafer such as a sapphire wafer, a dividing method using laser processing is known (see Japanese Patent Laid-open No. Hei 10-305420 and Japanese Patent No. 3408805, for example).

According to the dividing method described in Japanese Patent Laid-open No. Hei 10-305420, a pulsed laser beam is applied to the wafer to form a plurality of laser processed grooves on the front side of the wafer along the division lines, and an external force is next applied to the laser processed grooves to divide the wafer. According to the dividing method described in Japanese Patent No. 3408805, a pulsed laser beam having a transmission wavelength to the wafer is applied to the wafer to form a plurality of continuous modified layers inside the wafer along the division lines, and an external force is applied to the modified layers reduced in strength to divide the wafer.

SUMMARY OF THE INVENTION

In the light emitting device mentioned above, light emitted from the light emitting layer into the sapphire substrate is emerged from the sapphire substrate to the ambient air. However, since the refractive index of sapphire is remarkably larger than that of air, there is a problem such that the light is not efficiently emerged from the sapphire substrate. This is due to the fact that when the angle of incidence of light upon the interface between the sapphire substrate and the air is greater than a critical angle (34.5°) total reflection occurs on this interface, causing confinement of the light inside the sapphire substrate.

It is therefore an object of the present invention to provide a sapphire wafer dividing method which can improve the luminance of the light emitting device formed by dividing a sapphire wafer.

In accordance with an aspect of the present invention, there is provided a dividing method for a sapphire wafer having a sapphire substrate and a light emitting layer formed on the sapphire substrate, the light emitting layer being partitioned by a plurality of crossing division lines to define a plurality regions where a plurality of light emitting devices are respectively formed, the dividing method including a modified layer forming step of applying a laser beam having a transmission wavelength to the sapphire wafer from the back side of the sapphire wafer along the division lines in a condition where the focal point of the laser beam is set inside the sapphire wafer, thereby forming a plurality of modified layers inside the sapphire wafer along the division lines; and a chamfering and dividing step of cutting the sapphire wafer from the back side thereof by using a cutting blade to thereby form a plurality of cut grooves along the division lines after performing the modified layer forming step, thereby chamfering each light emitting device and simultaneously dividing the sapphire wafer into the individual light emitting devices along the division lines from the modified layers as a division start point.

With this configuration, the cut grooves are formed on the back side of the sapphire wafer along the division lines in the chamfering and dividing step, thereby chamfering the corners of the back side of each light emitting device divided from the sapphire wafer. By performing this chamfering, a polyhedral surface is formed on the back side of each light emitting device, so that the light reflected in the device is easily incident on the polyhedral surface at an angle less than or equal to the critical angle. Accordingly, the light emitted from the light emitting layer of each device can be easily emerged to the outside, thereby improving the luminance of each light emitting device. The chamfering to be performed in the present invention is not limited to forming the corners of each light emitting device into slant surfaces, but includes forming the corners of each light emitting device into any shape such as curved surfaces capable of suppressing the preservation of a reflective angle. Further, the cut grooves are formed after forming the modified layers inside the sapphire wafer. Accordingly, an external force is applied to the modified layers in forming the cut grooves, so that the sapphire wafer is divided along the modified layers as a division start point. Thus, the division of the sapphire wafer can be performed simultaneously with the formation of the cut grooves on the sapphire wafer, so that the number of steps can be reduced to improve the working efficiency.

According to the present invention, the cut grooves are formed on the sapphire wafer along the division lines to divide the sapphire wafer into the individual light emitting devices along the cut grooves, so that the light emitted from the light emitting layer of each light emitting device can be easily emerged to the outside to improve the luminance. Further, the cut grooves are formed after forming the modified layers inside the sapphire wafer, so that the division of the sapphire wafer can be performed simultaneously with the formation of the cut grooves on the sapphire wafer.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

The division of a sapphire wafer using a dividing method according to a preferred embodiment of the present invention is carried out by sequentially performing a modified layer forming step by a laser processing apparatus and a chamfering and dividing step by a cutting apparatus. In the modified layer forming step, modified layers are formed inside the sapphire wafer along division lines. In the chamfering and dividing step, the back side of the sapphire wafer having a light emitting layer on the front side is cut to form cut grooves along the division lines and simultaneously divide the sapphire wafer into individual light emitting devices.

Each light emitting device obtained by performing these steps is characterized in that the corners of the back side of each light emitting device are chamfered by the cut grooves formed in the chamfering and dividing step, so that light emitted from the light emitting layer formed on the front side of each light emitting device can be easily emerged. The configuration of the apparatus used in each step in this preferred embodiment will now be described with reference to the attached drawings.

Figure 1:
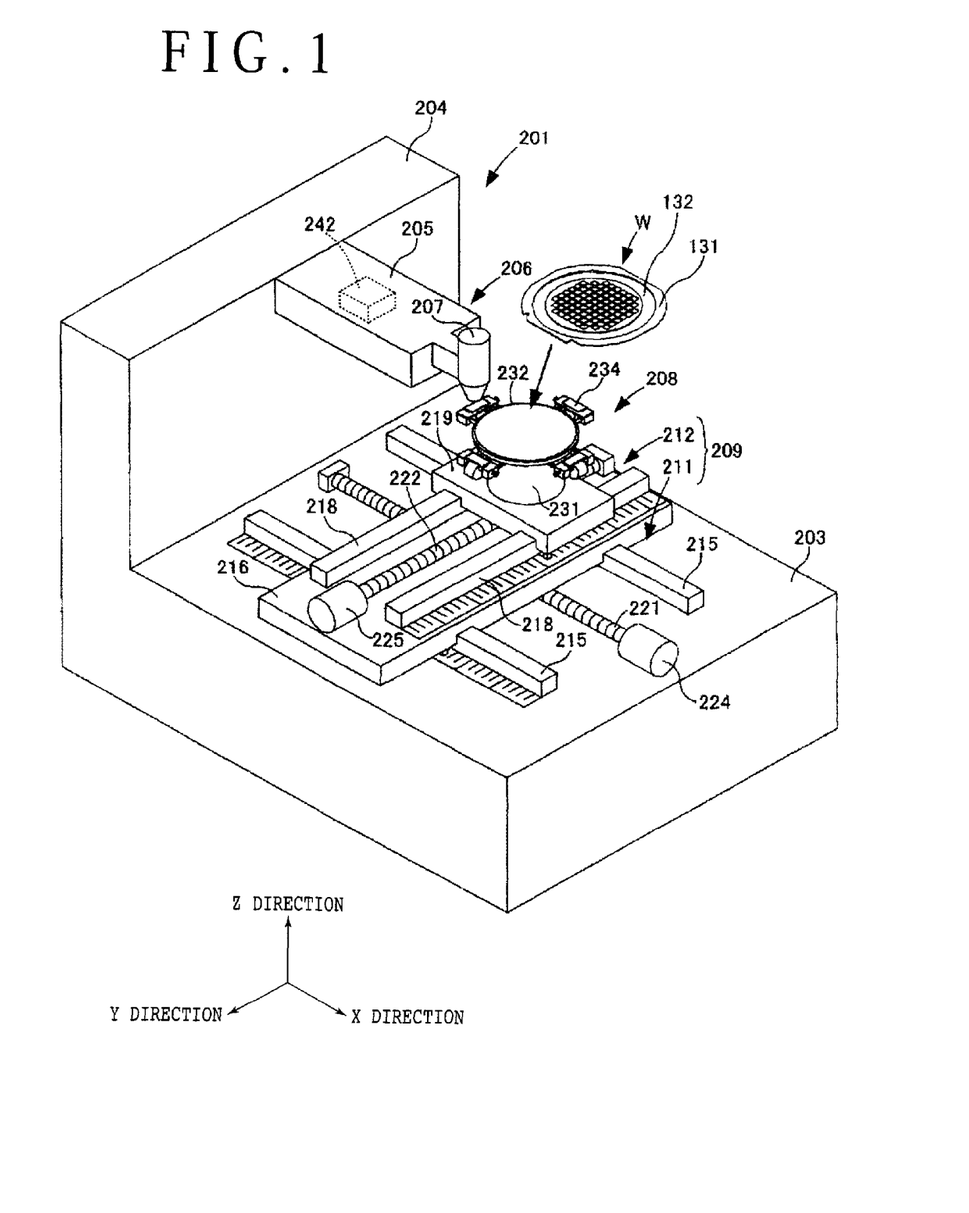
FIG. 1 is a perspective view of a laser processing apparatus for performing a modified layer forming step in the dividing method according to the present invention.

Referring to FIG. 1, there is shown a perspective view of a laser processing apparatus 201 for forming modified layers inside a sapphire wafer W according to a preferred embodiment of the present invention. The configuration of the laser processing apparatus used in the dividing method of the present invention is not limited to the configuration shown in FIG. 1, but may be any configuration provided that modified layers can be formed inside the sapphire wafer W.

As shown in FIG. 1, the laser processing apparatus 201 is configured so as to process the sapphire wafer W by relatively moving a laser processing unit 206 for applying a laser beam to the sapphire wafer W and a chuck table 208 holding the sapphire wafer W. The sapphire wafer W is substantially circular in shape, and it is composed of a sapphire ($Al_2O_3$) substrate and a light emitting layer formed on the front side of the sapphire substrate. The light emitting layer is partitioned into a plurality of regions by a plurality of crossing division lines, and a light emitting device such as an LED is formed in each region.

The sapphire wafer W is attached to a dicing tape 132 supported to an annular frame 131 in the condition where the light emitting layer formed on the front side of the sapphire substrate is oriented downward to adhere to the dicing tape 132. Although the sapphire wafer W is used as a light emitting device wafer in this preferred embodiment, the light emitting device wafer is not limited to the sapphire wafer W according to the present invention. For example, the configuration of the light emitting device wafer is not limited to the configuration that a light emitting layer is formed on a sapphire substrate, but may be any configuration such that a light emitting layer is formed on a GaAs (gallium arsenide) substrate or a SiC (silicon carbide) substrate.

The laser processing apparatus 201 has a boxlike bed portion 203 and a column portion 204 formed on the upper surface of the bed portion 203 at its rear end. An arm portion 205 projects from the front surface of the column portion 204, and a laser head 207 constituting the laser processing unit 206 is provided at the front end of the arm portion 205.

A chuck table moving mechanism 209 for feeding the chuck table 208 in the X direction and indexing the chuck table 208 in the Y direction is provided on the upper surface of the bed portion 203. The chuck table moving mechanism 209 is composed of a feeding mechanism 211 for feeding the chuck table 208 in the X direction and an indexing mechanism 212 for indexing the chuck table 208 in the Y direction. The feeding mechanism 211 has an X-axis table 216 movable in the X direction relative to the bed portion 203. The X-axis table 216 is supported to a pair of parallel guide rails 215 extending in the X direction on the upper surface of the bed portion 203. The X-axis table 216 is movable in the X direction by a ball screw type moving mechanism.

The indexing mechanism 212 has a Y-axis table 219 movable in the Y direction relative to the X-axis table 216. The Y-axis table 219 is supported to a pair of parallel guide rails 218 extending in the Y direction on the upper surface of the X-axis table 216. The Y-axis table 219 is movable in the Y direction by a ball screw type moving mechanism. The chuck table 208 is provided on the upper surface of the Y-axis table 219.

The chuck table 208 has a θ table 231 supported to the upper surface of the Y-axis table 219 so as to be rotatable about the Z axis and a work holding member 232 provided on the upper end of the θ table 231 for holding the sapphire wafer W under suction. The work holding member 232 is a circular member having a predetermined thickness and has a suction holding surface formed of a porous ceramic material at a central portion on the upper surface. This suction holding surface functions to hold the sapphire wafer W through the dicing tape 132 under suction, and is connected through a pipe provided in the θ table 231 to a vacuum source.

Four clamps 234 are provided at equal intervals around the work holding member 232 in such a manner that each clamp 234 is supported through a pair of support arms extending radially outward from the outer circumference of the θ table 231. These four clamps 234 are driven by an air actuator to hold the annular frame 131 supporting the sapphire wafer W through the dicing tape 132.

The laser processing unit 206 has the laser head 207 provided at the front end of the arm portion 205. An optical system of the laser processing unit 206 is provided in the arm portion 205 and the laser head 207. The laser head 207 includes a focusing lens for focusing a laser beam oscillated from an oscillator 242 to laser-process the sapphire wafer W held on the chuck table 208. The laser beam has a transmission wavelength to the sapphire wafer W, and the focal point of the laser beam is set inside the sapphire wafer W by the optical system.

By the operation of the laser beam applied from the laser head 207 to the sapphire wafer W, a modified layer 402 (see FIG. 4A) as a division start point is formed inside the sapphire wafer W along each division line. Each modified layer 402 means a region different from its ambient region in density, refractive index, mechanical strength, or any other physical properties in the sapphire wafer W due to the application of the laser beam, causing a reduction in strength as compared with the ambient region. Examples of each modified layer 402 include a melted and rehardened region, cracked region, breakdown region, and refractive index changed region. These regions may be present in a mixed condition.

The laser processing operation by the laser processing apparatus 201 will now be described. First, the sapphire wafer W is placed on the chuck table 208, and the chuck table 208 is next moved to a processing position below the laser head 207. Thereafter, a laser beam outlet of the laser head 207 is aligned to a predetermined one of the division lines extending in a first direction on the sapphire wafer W, and the focal point of the laser beam to be applied from the laser head 207 is set inside the sapphire wafer W. In this condition, laser processing started.

That is, the laser beam is applied to the sapphire wafer W and the chuck table 208 holding the sapphire wafer W is fed in the X direction to thereby form a modified layer 402 inside the sapphire wafer W along the predetermined division line. Thereafter, the chuck table 208 is indexed in the Y direction by the pitch of the division lines and a laser processing operation is similarly performed to form another modified layer 402 along the division line adjacent to the predetermined division line mentioned above. This operation is repeated to form a plurality of modified layers 402 along all of the division lines extending in the first direction.

Thereafter, the chuck table 208 is rotated 90° by the θ table 231 to form a plurality of modified layers 402 along all of the division lines extending in a second direction perpendicular to the first direction on the sapphire wafer W. Thus, the modified layers 402 are formed inside the sapphire wafer W along all of the crossing division lines extending in the first and second directions. Thereafter, the sapphire wafer W is removed from the chuck table 208 and next transported to a cutting apparatus 101 shown in FIG. 2.

Figure 2:
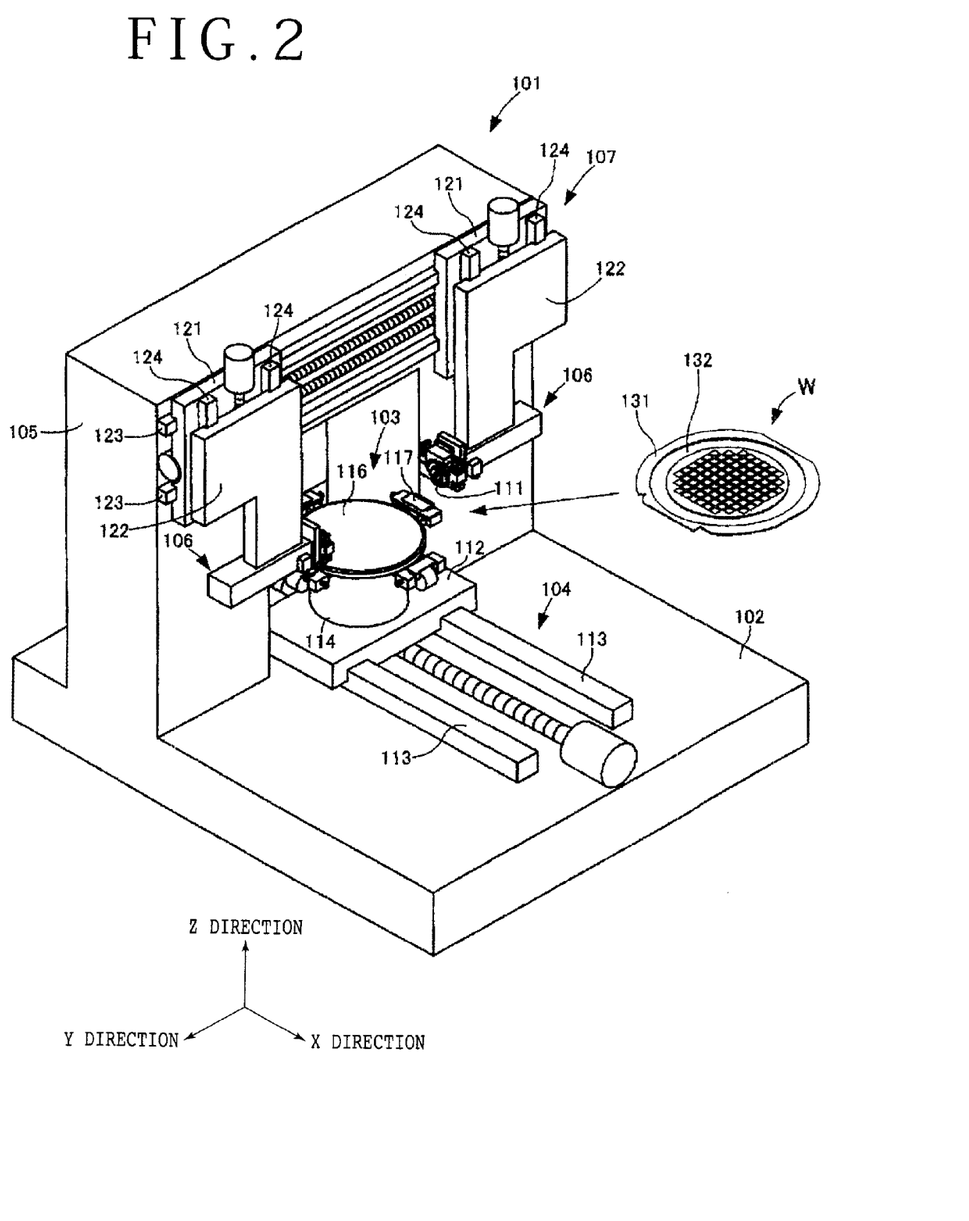
FIG. 2 is a perspective view of a cutting apparatus for performing a chamfering and dividing step in the dividing method according to the present invention.

Referring to FIG. 2, there is shown a perspective view of a cutting apparatus 101 for forming cut grooves on the sapphire wafer W and simultaneously dividing the sapphire wafer W according to a preferred embodiment of the present invention. The configuration of the cutting apparatus used in the dividing method of the present invention is not limited to the configuration shown in FIG. 2, but may be any configuration provided that cut grooves can be formed on the sapphire wafer W.

As shown in FIG. 2, the cutting apparatus 101 is configured so as to cut the sapphire wafer W by relatively moving a pair of blade units 106 each having a cutting blade 111 and a chuck table 103 holding the sapphire wafer W. The cutting apparatus 101 has a base 102 and a chuck table moving mechanism 104 provided on the base 102 for feeding the chuck table 103 in the X direction. A gantry-shaped column portion 105 is formed on the base 102 so as to straddle the chuck table moving mechanism 104. The column portion 105 is provided with a blade unit moving mechanism 107 for indexing the pair of blade units 106 in the Y direction above the chuck table 103.

The chuck table moving mechanism 104 has an X-axis table 112 for supporting the chuck table 103 thereon. The X-axis table 112 is supported to a pair of parallel guide rails 113 extending in the X direction on the upper surface of the base 102. The X-axis table 112 is movable in the X direction by a ball screw type moving mechanism.

The chuck table 103 has a θ table 114 supported to the upper surface of the X-axis table 112 so as to be rotatable about the Z axis and a work holding member 116 provided on the upper end of the θ table 112 for holding the sapphire wafer W under suction. The work holding member 116 is a circular member having a predetermined thickness and has a suction holding surface formed of a porous ceramic material at a central portion on the upper surface. This suction holding surface functions to hold the sapphire wafer W through the dicing tape 132 under suction, and is connected through a pipe provided in the θ table 114 to a vacuum source.

Four clamps 117 are provided at equal intervals around the work holding member 116 in such a manner that each clamp 117 is supported through a pair of support arms extending radially outward from the outer circumference of the θ table 114. These four clamps 117 are driven by an air actuator to hold the annular frame 131 supporting the sapphire wafer W.

The blade unit moving mechanism 107 has a pair of Y-axis tables 121 movable in the Y direction relative to the front side of the column portion 105 and a Z-axis table 122 movable in the Z direction relative to the front side of each Y-axis table 121. The pair of blade units 106 are provided at the lower ends of the pair of Z-axis tables 122, respectively. Each Y-axis table 121 is supported to a pair of parallel guide rails 123 extending in the Y direction on the front side of the column portion 105. Each Y-axis table 121 is movable in the Y direction by a ball screw type moving mechanism. Each Z-axis table 122 is supported to a pair of parallel guide rails 124 extending in the Z direction on the front side of each Y-axis table 121. Each Z-axis table 122 is movable in the Z direction by a ball screw type moving mechanism.

Each blade unit 106 has a circular cutting blade 111 provided at the front end of a spindle rotating about the Y axis and a plurality of nozzles (not shown) for spraying a cutting water to a portion to be cut. Each blade unit 106 is operated so that the cutting blade 111 is rotated at a high speed by the spindle and the cutting water is sprayed from the plural nozzles to the portion to be cut, thereby cutting the sapphire wafer W.

The cutting operation by the cutting apparatus 101 will now be described. First, the sapphire wafer W is placed on the chuck table 103 and the chuck table 103 is next moved to a cutting position below the cutting blades 111. Thereafter, the cutting edge of either cutting blade 111 is aligned to a predetermined one of the division lines (the modified layers 402) extending in the first direction on the sapphire wafer W. Thereafter, the corresponding blade unit 106 is lowered to bring the cutting edge rotating at a high speed into cut in the sapphire wafer W by a predetermined depth from the back side of the sapphire wafer W.

When the sapphire wafer W is cut by the cutting blade 111 as mentioned above, the chuck table 103 is fed in the X direction to thereby form a cut groove 401 (see FIG. 4B) on the back side of the sapphire wafer W along the predetermined division line, i.e., along the predetermined modified layer 402 extending in the first direction. At this time, an external force is applied to the modified layer 402 by the cutting operation of the cutting blade 111 into the sapphire wafer W, so that the sapphire wafer W is divided along the modified layer 402 as a division start point. Thereafter, the cutting blade 111 is indexed in the Y direction by the pitch of the division lines, and a cutting operation is similarly performed to form another cut groove 401 along the modified layer 402 adjacent to the predetermined modified layer 402, thereby dividing the sapphire wafer W along this modified layer 402. This operation is repeated to form a plurality of cut grooves 401 along all of the modified layers 402 extending in the first direction and simultaneously divide the sapphire wafer W along these modified layers 402.

Thereafter, the chuck table 103 is rotated 90° by the θ table 114 to form a plurality of cut grooves 401 along all of the modified layers 402 extending in the second direction perpendicular to the first direction. Also in this case, the sapphire wafer W is divided along the modified layers 402 extending in the second direction as a division start point simultaneously with the formation of the cut grooves 401 on the sapphire wafer W. Thus, the cut grooves 401 are formed on the back side of the sapphire wafer W along all of the crossing modified layers 402 extending in the first and second directions, thereby dividing the sapphire wafer W along all of the crossing modified layers 402. The cutting apparatus 101 may be configured so that ultrasonic vibrations are transmitted to the cutting edge of each cutting blade 111 in cutting the sapphire wafer W, thereby reducing a cutting load to the sapphire wafer W. In the above-mentioned manner, the sapphire wafer W is divided along the modified layers 402 as a division start point to obtain the individual light emitting devices 411 (see FIG. 4C). Each light emitting device 411 is picked up under suction by a pickup collet 301 (see FIG. 4C) and peeled off from the dicing tape 132.

Figure 3A:
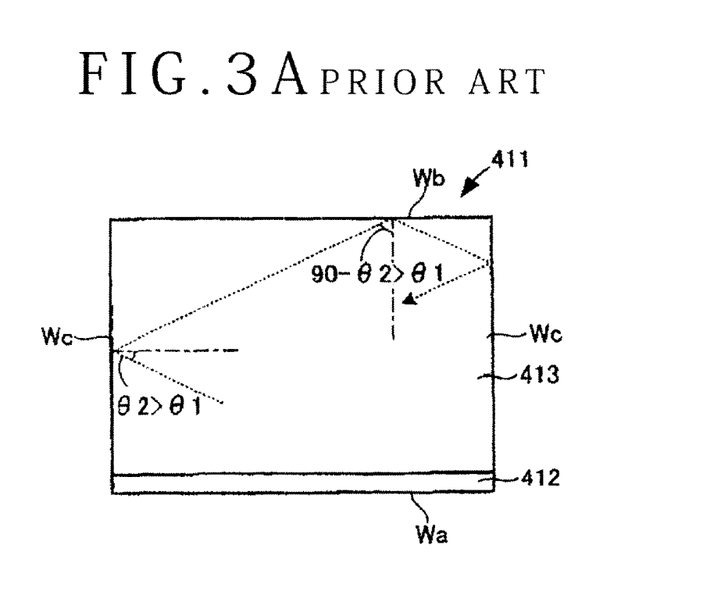
FIG. 3A is a side view of a light emitting device obtained by a dividing method in the prior art.
Figure 3B:
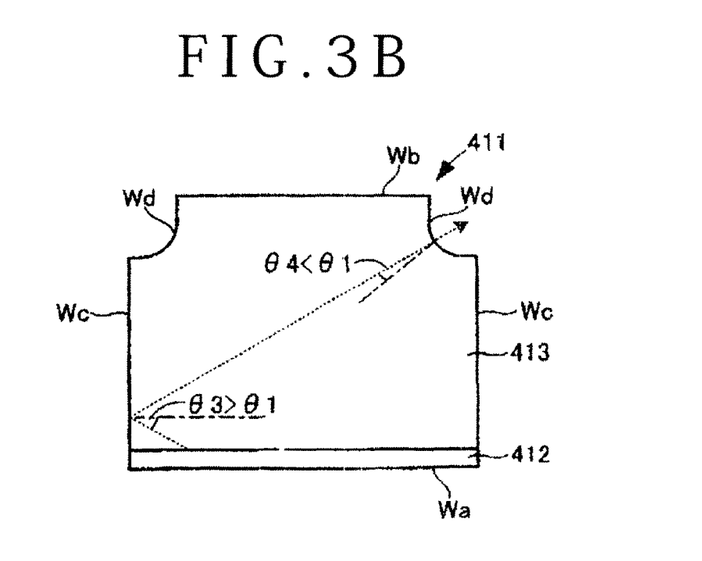
FIG. 3B is a side view of a light emitting device obtained by the dividing method of the present invention.

As shown in FIG. 3B, each light emitting device 411 has a substantially boxlike shape, and four chamfered portions Wd are formed at the four corners between the back surface Wb and the four side surfaces Wc (broken surfaces). In FIGS. 3A and 3B, the broken line denotes a ray of light emitted from a light emitting layer 412 of each light emitting device 411, and the dot and dash line denotes a normal to the interface between a sapphire substrate 413 of each light emitting device 411 and the ambient air. Each chamfered portion Wd is formed by dividing each cut groove 401 of the sapphire wafer W. By the formation of each chamfered portion Wd, the light emitted from the light emitting layer 412 can be easily emerged from the sapphire substrate 413 to the ambient air, thereby improving the luminance of each light emitting device 411. The light reflected on the side surfaces Wc and the back surface Wb is not reflected on the chamfered portions Wd, but is passed therethrough.

More specifically, when the light emitted from the light emitting layer 412 is incident on one of the side surfaces Wc in the sapphire substrate 413 as shown by the broken line in FIG. 3B, the critical angle $\theta_1$ allowing the light to pass through this side surface Wc is 34.5° with respect to the normal shown by the dot and dash line in FIG. 3B. If the light is incident on the side surface Wc at an angle less than or equal to this critical angle $\theta_1$, the light is not totally reflected on the side surface Wc. However, if the light is incident on the side surface Wc at an angle greater than this critical angle $\theta_1$, the light is totally reflected on the side surface Wc. In each light emitting device 411 shown in FIG. 3B, the back surface Wb is so formed as to have a polyhedral shape by the formation of the chamfered portions Wd, so that the preservation of an incident angle is inhibited at the chamfered portions Wd to reduce the repetition of total reflection at an incident angle greater than the critical angle.

In the case of a boxlike light emitting device 411 having no chamfered portions shown in FIG. 3A, there is a case that when light is incident on one of the side surfaces Wc at an angle greater than the critical angle $\theta_1$, a reflective angle is preserved to repeat total reflection in the sapphire substrate 413. For example, there is a case that light is incident on the side surface Wc at an incident angle $\theta_2$ greater than the critical angle $\theta_1$, the light totally reflected on the side surface Wc is next incident on the back surface Wb at an incident angle $(90-\theta_2)$ greater than the critical angle $\theta_1$, and the light is totally reflected on the back surface Wb as shown in FIG. 3A. In this case, the incidence of the light on the interface of the light emitting device 411 at the incident angle $\theta_2$ and the incident angle $(90-\theta_2)$ is repeated, so that total reflection on the interface is repeated to cause a problem such that the light may finally disappear in the sapphire substrate 413.

On the other hand, in the boxlike light emitting device 411 having the chamfered portions Wd obtained by the dividing method of the present invention as shown in FIG. 3B, the light emitted from the light emitting layer 412 is easily incident on the interface at an angle less than or equal to the critical angle $\theta_1$ owing to the formation of the chamfered portions Wd. For example, there is a case that light is incident on the side surface Wc at an incident angle $\theta_3$ greater than the critical angle $\theta_1$, and the light totally reflected on the side surface Wc is next incident on one of the chamfered portions Wd at an incident angle $\theta_4$ less than the critical angle $\theta_1$ as shown in FIG. 3B. Further, in the case that the light is reflected on the chamfered portion Wd at an angle greater than the critical angle $\theta_1$, the light reflected on the chamfered portion Wd is easily incident on the side surface Wc or the back surface Wb at an angle less than or equal to the critical angle $\theta_1$. Thus, even when the light is incident on the side surface Wc or the back surface Wb at an angle greater than the critical angle $\theta_1$, the preservation of the angle of reflection at the chamfered portion Wd is inhibited.

In this manner, the repetition of the total reflection of light in the sapphire substrate 413 can be reduced by the formation of the chamfered portions Wd, so that the amount of light emerging from the sapphire substrate 413 can be increased. In other words, an escape cone of each light emitting device 411 (an area where the light emitted from an arbitrary light emitting point can pass through the interface between the sapphire substrate 413 and the ambient air) can be enlarged. Thus, each light emitting device 411 according to this preferred embodiment is improved in luminance owing to chamfering of the back surface Wb.

Figure 4A:
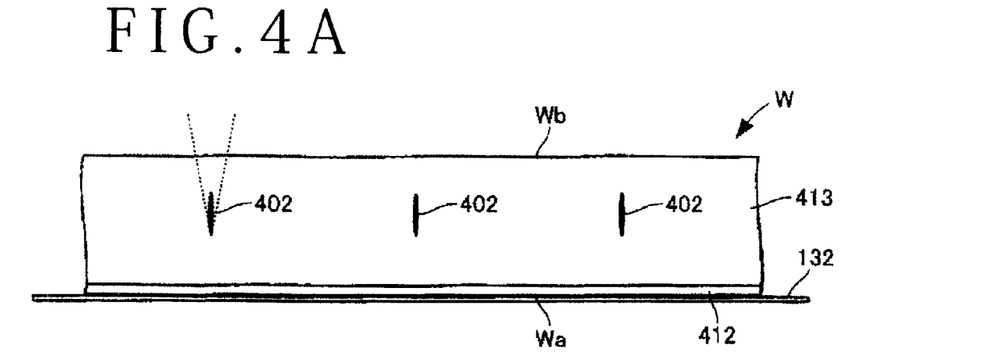
FIGS. 4A to 4C are side views for illustrating the dividing method according to the present invention.

The flow of the dividing method according to this preferred embodiment will now be described with reference to FIGS. 4A to 4C. The processing conditions shown below in using the laser processing apparatus 201 and the cutting apparatus 101 are merely illustrative and suitably changeable. As shown in FIG. 4A, the modified layer forming step is first performed by the laser processing apparatus 201. For example, the laser processing operation is performed under the conditions where a pulsed laser beam having a wavelength of 1064 nm, a power of 0.3 W, and a repetition frequency of 100 kHz is used as the laser beam. In the modified layer forming step, the focal point of the laser beam is set at a predetermined depth from the back surface Wb of the sapphire wafer W to form the modified layers 402 inside the sapphire wafer W along the division lines. For example, the focal point of the laser beam is set at a depth of about 40 μm from the back surface Wb of the sapphire wafer W. In this case, each modified layer 402 having a height of about 25 μm from the focal point is formed inside the sapphire wafer W.

Figure 4B:
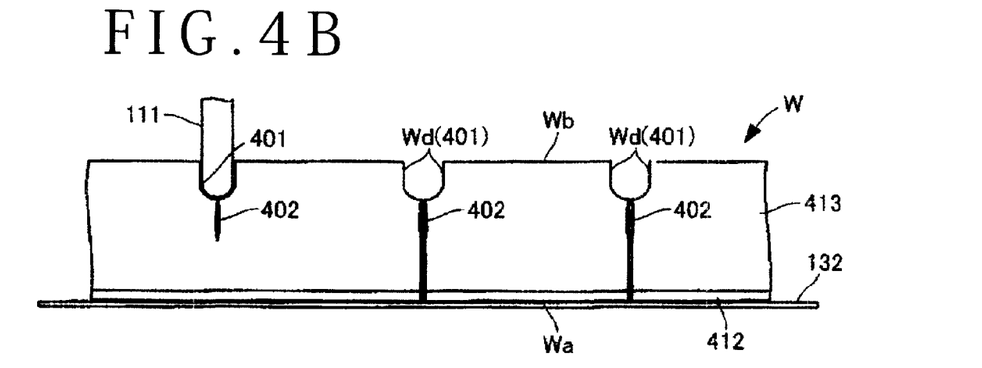

As shown in FIG. 4B, the chamfering and dividing step is next performed by the cutting apparatus 101. For example, the cutting operation is performed under the conditions where the rotational speed of the cutting blade 111 is set to 20000 rpm and the feed speed of the chuck table 103 is set to 100 mm/s. In the chamfering and dividing step, the cutting blade 111 is cut into the sapphire wafer W to the predetermined depth from the back surface Wb of the sapphire wafer W to thereby form the cut grooves 401 along the modified layers 402. In forming the cut grooves 401, an external force is applied to the sapphire wafer W by the cutting blade 111, thereby dividing the sapphire wafer W along the division lines in such a manner that the division is started from the modified layers 402 as a division start point. Each cut groove 401 formed on the sapphire wafer W extends above the corresponding modified layer 402 and is divided into right and left portions as viewed in FIG. 4B with respect to this modified layer 402. Accordingly, the corners of the back surface of each light emitting device 411 become the chamfered portions formed by the cut grooves 401 in the chamfering and dividing step.

In the chamfering and dividing step, the chamfered portions are formed by forming the cut grooves 401 on the sapphire wafer W and the sapphire wafer W is divided along the modified layers 402 as a division start point. For example, the depth of cut from the back surface Wb of the sapphire wafer W is set to about 20 μm, thereby dividing the sapphire wafer W along the modified layers 402 as a division start point. The cutting blade 111 is preferably provided by a blade formed by binding diamond abrasive grains with a nickel plating which is hard to wear. Accordingly, a change in shape of the front end of the cutting blade 111 can be suppressed, so that the chamfered portions Wd having a good shape can be formed on the sapphire wafer W.

The shape and width of the front end of the cutting blade 111 can be varied by the nickel plating. In particular, the front end of the cutting blade 111 is preferably formed as a surface not parallel or perpendicular to the back surface Wb of the sapphire wafer W (an inclined surface with respect to the back surface Wb), such as a curved surface. Accordingly, a reflective surface that can inhibit the preservation of a reflective angle can be formed at each chamfered portion Wd of each light emitting device 411, thereby improving the luminance of each light emitting device 411.

If the grain size of the abrasive grains forming the cutting blade 111 is too large, the bottom surface of each cut groove 401 becomes rough, so that the laser beam used in the modified layer forming step is scattered on the bottom surface of each cut groove 401, causing a reduction in accuracy of each modified layer 402. On the other hand, if the grain size of the abrasive grains forming the cutting blade 111 is too small, the reflection causing the preservation of a reflective angle easily occurs on the bottom surface of each cut groove 401. Accordingly, the grain size of the abrasive grains forming the cutting blade 111 is set to preferably #1000 to #4000 (about 2 to 17 μm in diameter), more preferably #1500 to #3000 (about 3 to 9 μm in diameter), and further more preferably #1800 to #2500 (about 3 to 8 μm in diameter).

While the cutting blade 111 is provided by a nickel plated blade using diamond abrasive grains in this preferred embodiment, the configuration of the cutting blade 111 is not limited to the above configuration, but may be any configuration capable of cutting the sapphire wafer W.

Figure 4C:
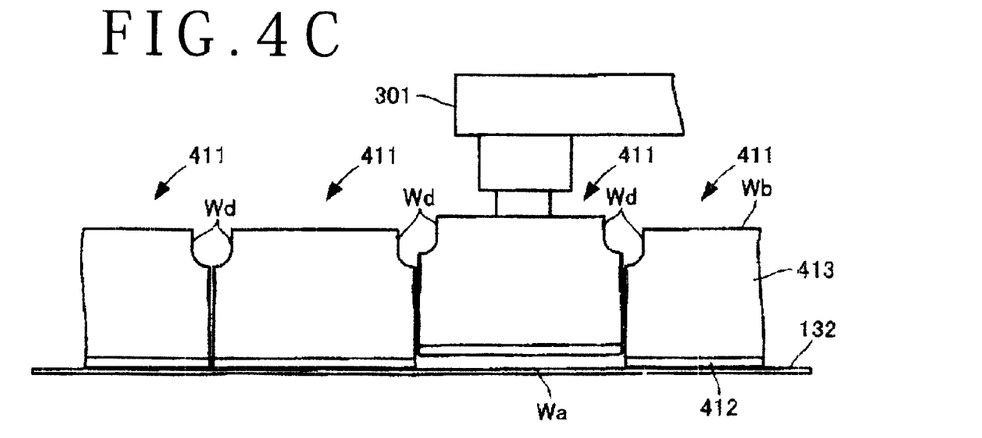

As shown in FIG. 4C, each light emitting device 411 divided from the sapphire wafer W is next picked up under suction by the pickup collet 301 and peeled off from the dicing tape 132. As described above, the corners of the back surface of each light emitting device 411 is chamfered, so that the light emitted from the light emitting layer 412 can be easily emerged from the sapphire substrate 413 to the outside thereof. Thus, the sapphire wafer W is divided by the dividing method according to this preferred embodiment to thereby improve the luminance of each light emitting device 411 divided from the sapphire wafer W.

There is a case that a part of the division lines of the sapphire wafer W may be divided in forming the modified layers 402 in the modified layer forming step. In such a case, there is a possibility that a gap may be produced at the divided part of the sapphire wafer W in transporting the sapphire wafer W, causing general displacement of the division lines. To cope with this possibility, a cutting blade having a large blade width may be used as the cutting blade 111 in the chamfering and dividing step, thereby absorbing the displacement of the division lines. The blade width may be suitably selected according to chip size or wafer thickness. In consideration of the manufacturing yield of the cutting blade, the blade width is set to preferably 50 to 300 μm and more preferably 80 to 300 μm. Instead of the use of such a cutting blade having a large blade width in the chamfering and dividing step, the frequency of alignment processing by an alignment unit (not shown) in the cutting apparatus 101 may be increased to thereby improve the accuracy of alignment of the cutting blade 111 to the division lines displaced.

According to the dividing method in this preferred embodiment mentioned above, the cut grooves 401 are formed on the sapphire wafer W along the division lines in the chamfering and dividing step to thereby chamfer the corners of each light emitting device 411 divided from the sapphire wafer W. By this chamfering, a polyhedral shape is formed on the back surface of each light emitting device 411, so that the light reflected in the device 411 is easily incident on the polyhedral surface at an angle less than or equal to the critical angle. Accordingly, the light emitted from the light emitting layer 412 is easily emerged to the outside of the device 411, thereby improving the luminance of the light emitting device 411. Further, the cut grooves are formed after forming the modified layers inside the sapphire wafer. Accordingly, an external force is applied to the modified layers in forming the cut grooves, so that the sapphire wafer is divided along the modified layers as a division start point. Thus, the division of the sapphire wafer can be performed simultaneously with the formation of the cut grooves on the sapphire wafer, so that the number of steps can be reduced to improve the working efficiency.

Figure 5A:
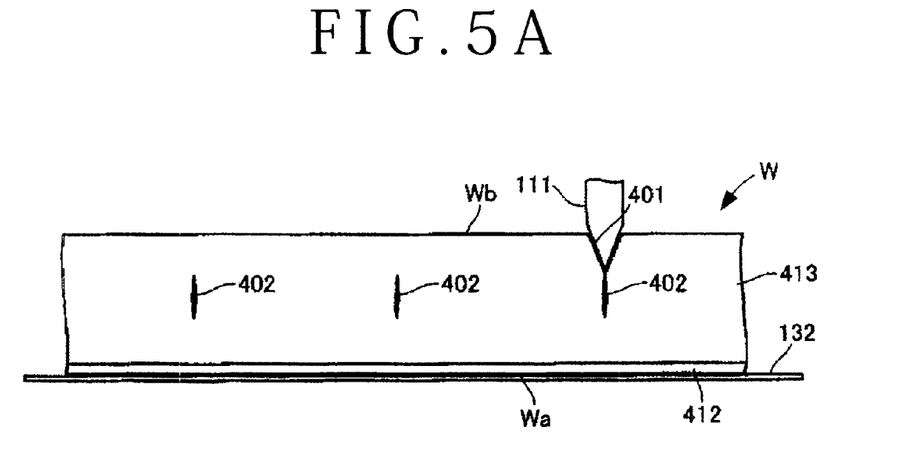
FIGS. 5A and 5B are side views for illustrating a modification of the dividing method according to the present invention.
Figure 5B:
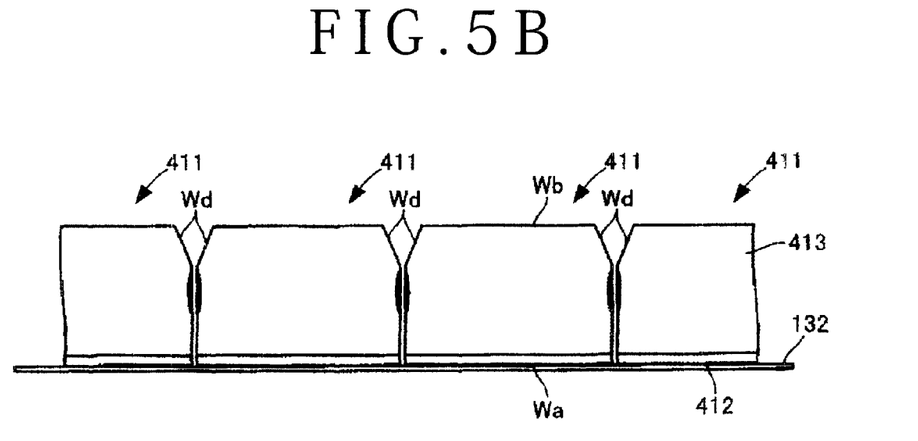

The front end of the cutting blade 111 is not especially limited in shape in this preferred embodiment. For example, a bevel blade as shown in FIG. 5A may be used as the cutting blade 111. In this case, a V-shaped cut groove 401 is formed on the back surface Wb of the sapphire wafer W along each modified layer 402 as shown in FIG. 5A. When the sapphire wafer W is divided as shown in FIG. 5B, the corners of each light emitting device 411 are beveled by the V-shaped cut grooves 401. In this manner, each cut groove 401 may have any reflective surface capable of inhibiting the preservation of a reflective angle.

The preferred embodiment mentioned above is merely illustrative in all respects, and the present invention is not limited to this preferred embodiment. The scope of the present invention is shown by the claims rather than the description of the preferred embodiment, and all changes and modifications within the equivalence of the scope of the claims are intended to be included in the present invention.

As described above, the present invention has an effect such that the luminance of each light emitting device formed by dividing a sapphire wafer can be improved. In particular, the present invention is useful for a dividing method of dividing a sapphire wafer into individual light emitting devices.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A dividing method for a sapphire wafer having a sapphire substrate and a light emitting layer formed on said sapphire substrate, said light emitting layer being partitioned by a plurality of crossing division lines to define a plurality of regions where a plurality of light emitting devices are respectively formed, said dividing method comprising:
a modified layer forming step of applying a laser beam having a transmission wavelength to said sapphire wafer from the back side of said sapphire wafer along said division lines in a condition where the focal point of said laser beam is set inside said sapphire wafer, thereby forming a plurality of modified layers inside said sapphire wafer along said division lines; and
a chamfering and dividing step of cutting said sapphire wafer from the back side thereof by using a cutting blade to thereby form a plurality of cut grooves along said division lines after performing said modified layer forming step, thereby chamfering each light emitting device and simultaneously dividing said sapphire wafer into said individual light emitting devices along said division lines from said modified layers as a division start point.

* * * * *